United States Patent [19]

Fujii et al.

[11] Patent Number: 5,254,136

[45] Date of Patent: Oct. 19, 1993

[54] TRICHROMATIC FIBER REACTIVE DYE COMPOSITION AND METHOD FOR DYEING OR PRINTING FIBER MATERIALS USING THE COMPOSITION

[75] Inventors: Miwako Fujii, Iruma; Naoki Harada, Ibaraki; Shuhei Hashizume, Osaka, all of Japan

[73] Assignee: Sumitomo Chemical Company, Limited, Osaka, Japan

[21] Appl. No.: 921,702

[22] Filed: Jul. 30, 1992

[30] Foreign Application Priority Data

Aug. 2, 1991 [JP] Japan .................. 3-217950

[51] Int. Cl.$^5$ ............. C09B 62/04; C09B 62/20; C09B 62/343
[52] U.S. Cl. ............. 8/549; 8/524; 8/543; 8/641; 8/643; 8/676; 8/685; 8/686; 8/918
[58] Field of Search .............. 8/549, 641, 643

[56] References Cited

U.S. PATENT DOCUMENTS

| | | | |
|---|---|---|---|
| 4,378,313 | 3/1983 | Kayane et al. | 534/638 |
| 4,841,031 | 6/1989 | Kayane et al. | 534/638 |
| 4,843,149 | 6/1989 | Kayane et al. | 534/632 |
| 4,888,028 | 12/1989 | Hihara et al. | 8/549 |
| 4,935,500 | 6/1990 | Omura et al. | 534/618 |
| 4,937,326 | 6/1990 | Kayane et al. | 534/638 |
| 5,047,067 | 9/1991 | Miyazaki et al. | 8/549 |
| 5,071,442 | 12/1991 | Luttringer et al. | 8/549 |

FOREIGN PATENT DOCUMENTS

| | | |
|---|---|---|
| 0300195 | 1/1989 | European Pat. Off. |
| 0318023 | 5/1989 | European Pat. Off. |
| 0437184 | 7/1991 | European Pat. Off. |
| 50-000178 | 1/1975 | Japan |
| 56-128380 | 10/1981 | Japan |
| 63-112781 | 5/1988 | Japan |
| 3-188167 | 8/1991 | Japan |

OTHER PUBLICATIONS

Chemical Abstracts, vol. 116, No. 2, Jan. 13, 1992, Columbus, Ohio, US; abstract no. 7868m, N. Harada; S. Hashizume, "Reactive dye mixtures", p. 65; column 2.
Patent Abstracts of Japan, vol. 15, No. 445 (C-884(4973) Nov. 13, 1991, & JP-A-31 88 167 (Sumitomo Chem. Co. Ltd.), Aug. 16, 1991.

Primary Examiner—A. Lionel Clingman
Attorney, Agent, or Firm—Stevens, Davis, Miller & Mosher

[57] ABSTRACT

Provided is a fiber reactive dye composition which can dye or print cellulose based fiber materials or materials containing the fiber materials uniformly with good build-up property and reproducibility and give dyed or printed products excellent in various fastness properties.

A fiber reactive dye composition which comprises at least five reactive dyes selected from the groups of reactive dyes represented by the following formulas (I) to (VII) respectively in the form of free acid:

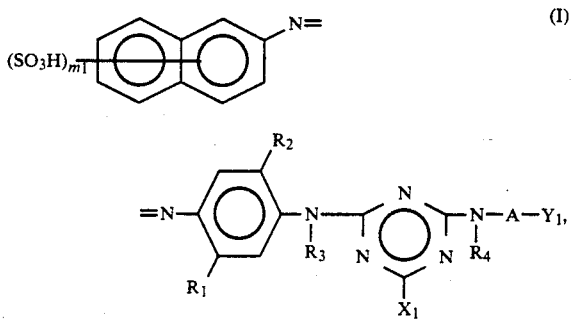

(Abstract continued on next page.)

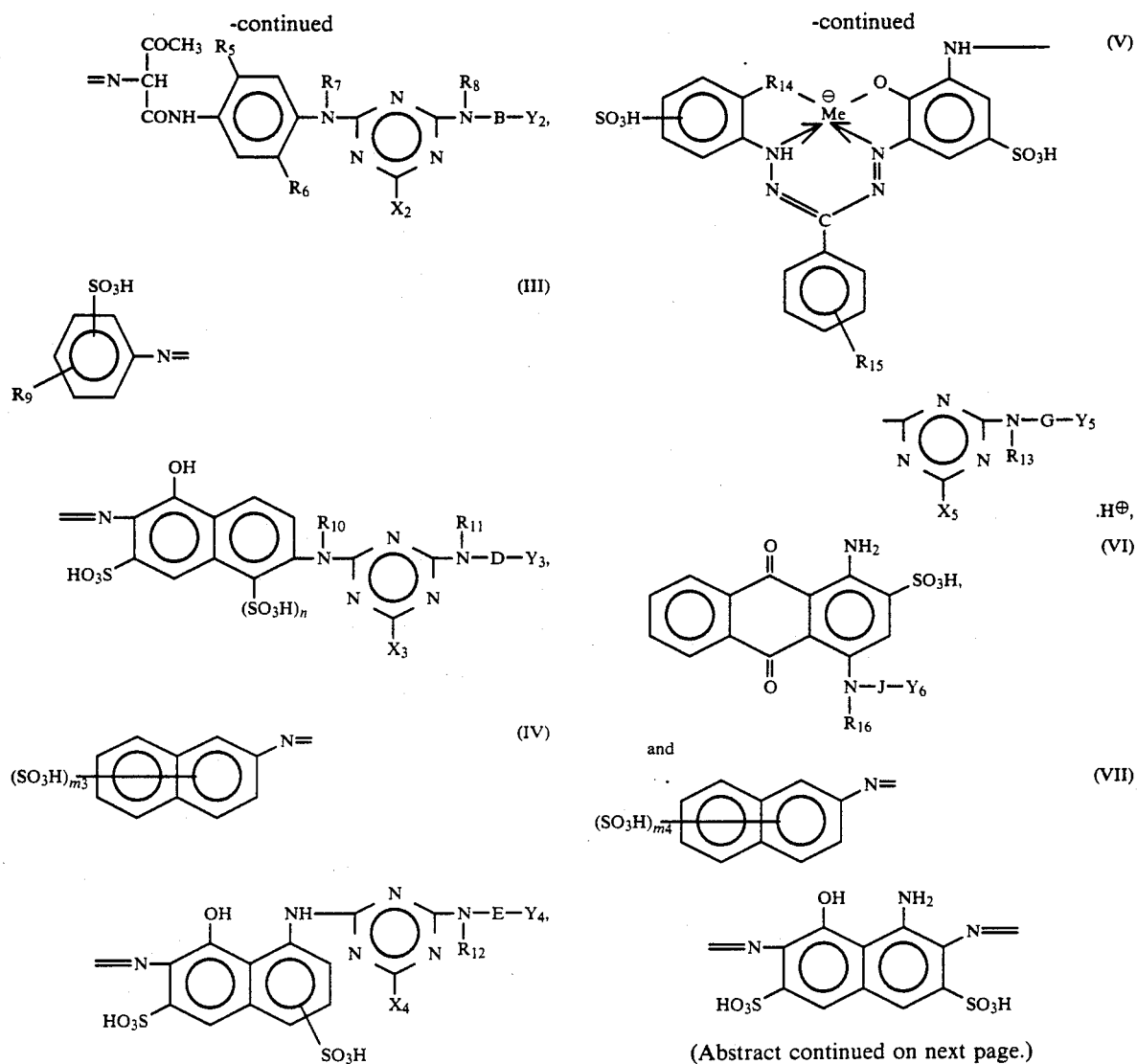
(Abstract continued on next page.)

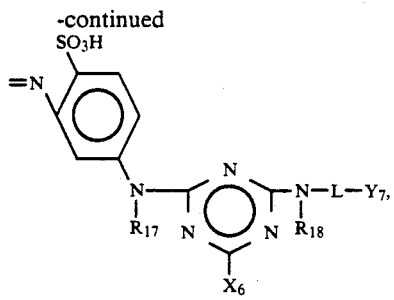

wherein $R_1$ and $R_2$ are each hydrogen, alkyl, ureido or the like, $R_5$ and $R_6$ are each hydrogen, sulfo or the like, $R_3$, $R_4$, $R_7$ to $R_{13}$ and $R_{15}$ to $R_{18}$ are each hydrogen, alkyl or the like, $R_{14}$ is —O— or

A, B, D, E, G, J and L are each phenylene or the like, $X_1$ to $X_6$ are each halogen, $Y_1$ to $Y_7$ are each —SO$_2$CH=CH$_2$ or —SO$_2$C$_2$H$_4$Z, Z being a group capable of being split off by the action of an alkali, $m_1$ to $m_4$ are each an integer of 1–3, and n is 0 or 1, provided that the composition contains respectively at least one yellow dye selected from those of the formulas (I) and (II), red dye selected from those of the formulas (III) and (IV) and blue dye selected from those of the formulas (V) to (VII).

14 Claims, No Drawings

TRICHROMATIC FIBER REACTIVE DYE COMPOSITION AND METHOD FOR DYEING OR PRINTING FIBER MATERIALS USING THE COMPOSITION

The present invention relates to a fiber reactive dye composition and a method for dyeing or printing fiber materials using the composition.

Fiber reactive dyes are extensively used in dyeing fiber materials, particularly cellulose based fiber materials, by virtue of their excellent dye characteristics. In the dyeing of fiber materials using fiber reactive dyes, it is known that a method is useful which comprises performing the dyeing or printing with a suitable combination of yellow, red and blue reactive dyes used as the tricromatic colors.

With respect to reactive dyes used as the tricromatic colors, it is required that the respective dyes are excellent in build-up property, leveling property and reproducibility of dyeing; the dyes of the tricromatic colors have equal dyeing rates, uniform dyeing temperature dependency and good compatibility; and the dyes of the tricromatic colors are excellent in various fastness properties including light fastness, perspiration-light fastness, washing fastness and chlorinated water fastness and these fastnesses are on the same level. As to the leveling property and the reproducibility of dying, in particular, with the recent trend toward diversification in the type and shape of fiber materials, automation of factories and simplification of operations based on shortening of the dyeing time, reactive dyes which are more enhanced in leveling property and in reproducibility of dyeing are eagerly desired. When the respective dyes of the trichromatic colors are different in build-up property from one another or when the dyeing properties in using the dyes each individually for dying are different from that in using the dyes in a suitable combination for dyeing, color matching by the computerized color matching system, which is in extensive use in recent years, can hardly be accomplished. When the dyeing rates and the dyeing temperature dependencies of these trichromatic color dyes respectively differ from one another, there arise the problem of poor leveling, in which uneven dyeing occurs in the course of dyeing, or the problem of poor reproducibility of dyeing, in which color difference occurs among dyeing lot to lot. When the fastnesses of the respective dyes of the trichromatic colors are not on the same level, marked discoloration is observed in all of the light fastness, perspiration-light fastness, washing fastness and chlorinated water fastness tests, and satisfactory dyed products can hardly be obtained.

The present inventors have made extensive study with the aim of resolving various problems of reactive dyes in the dyeing and printing of reactive dyes using the trichromatic colors, and as a result have accomplished the present invention.

The present invention provides a fiber reactive dye composition which comprises at least 5 reactive dyes selected from the group of reactive dyes represented by the following formulas (I) to (VII) respectively, the formulas being represented in the form of free acid for convenience:

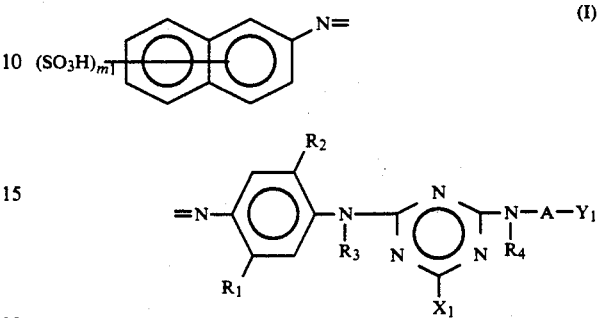

wherein $m_1$ is an integer of 1-3, $R_1$ and $R_2$ are each independently hydrogen, alkyl, alkoxy, acylamino or ureido, $R_3$ and $R_4$ are each independently hydrogen or unsubstituted or substituted alkyl, A is unsubstituted or substituted phenylene or naphthylene, $X_1$ is halogen, and $Y_1$ is $-SO_2CH=CH_2$ or $-SO_2CH_2CH_2Z_1$, $Z_1$ being a group capable of being split off by the action of an alkali,

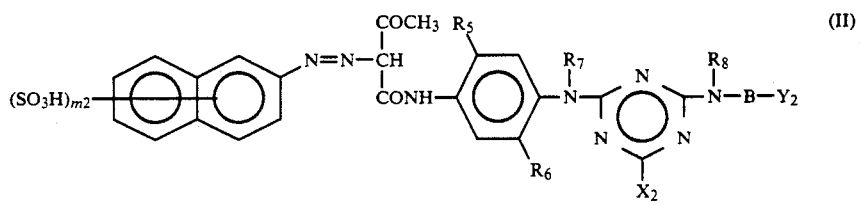

wherein $m_2$ is an integer of 1-3, $R_5$ and $R_6$ are each independently hydrogen, sulfo, alkyl or alkoxy, $R_7$ and $R_8$ are each independently hydrogen or unsubstituted or substituted alkyl, B is unsubstituted or substituted phenylene or naphthylene, $X_2$ is halogen and $Y_2$ is $-SO_2CH=CH_2$ or $-SO_2CH_2CH_2Z_2$, $Z_2$ being a group capable of being split off by the action of an alkali,

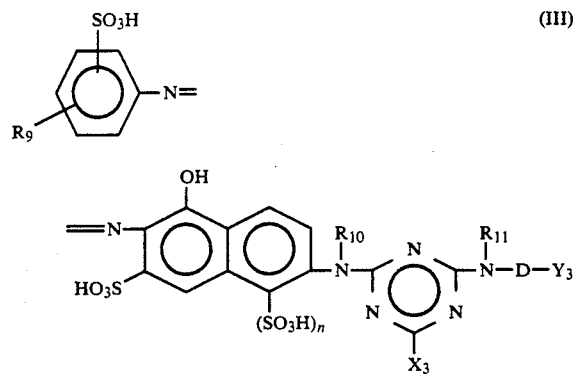

wherein n is 0 or 1, $R_9$ is hydrogen, alkyl or alkoxy, $R_{10}$ and $R_{11}$ are each independently hydrogen or unsubstituted or substituted alkyl, D is unsubstituted or substituted phenylene or naphthylene, $X_3$ is halogen and $Y_3$ is $-SO_2CH=CH_2$ or $-SO_2CH_2CH_2Z_3$, $Z_3$ being a group capable of being split off by the action of an alkali,

  (IV)

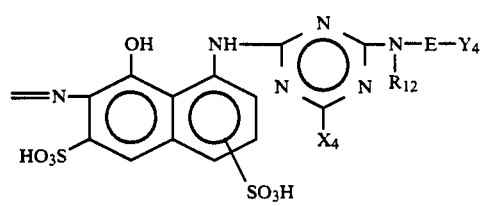

wherein $m_3$ is an integer of 1-3, $R_{12}$ is hydrogen or unsubstituted or substituted alkyl, E is unsubstituted or substituted phenylene or naphthylene, $X_4$ is halogen and $Y_4$ is $-SO_2CH=CH_2$ or $-SO_2CH_2CH_2Z_4$, $Z_4$ being a group capable of being split off by the action of an alkali,

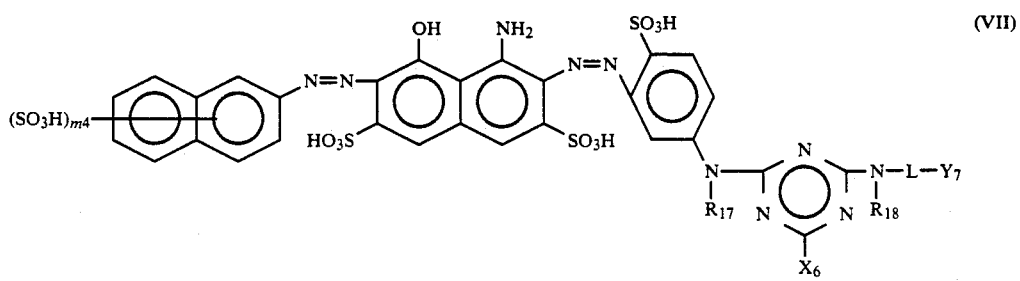

wherein $R_{13}$ is hydrogen or unsubstituted or substituted alkyl, $R_{14}$ is $-O-$ or

, $R_{15}$ is hydrogen methyl, ethyl, nitro, sulfo or chlorine, G is unsubstituted or substituted phenylene or naphthylene, Me is a metal ion of an atomic number of 27-29, $X_5$ is halogen and $Y_5$ is $-SO_2CH=CH_2$ or $-SO_2CH_2CH_2Z_5$, $Z_5$ being a group capable of being split off by the action of an alkali,

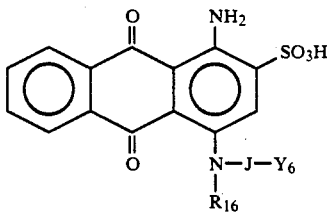  (VI)

wherein $R_{16}$ is hydrogen or unsubstituted or substituted alkyl, J is unsubstituted or substituted phenylene or naphthylene and $Y_6$ is $-SO_2CH=CH_2$ or $-SO_2CH_2CH_2Z_6$, $Z_6$ being a group capable of being split off by the action of an alkali, and

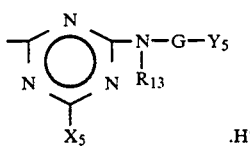  (VII)

wherein $m_4$ is an integer of 1-3, $R_{17}$ and $R_{18}$ are each independently hydrogen or unsubstituted or substituted alkyl, L is unsubstituted or substituted phenylene or naphthylene, $X_6$ is halogen, and $Y_7$ is $-SO_2CH=CH_2$ or $-SO_2CH_2CH_2Z_7$, $Z_7$ being a group capable of being split off by the action of an alkali, provided that the dye composition contains at least one yellow reactive dye selected from the group of reactive dyes represented by the formulas (I) and (II), at least one red reactive dye selected from the group of reactive dyes represented by the formulas (III) and (IV) and at least one blue reactive dye selected from the group of reactive dyes represented by the formulas (V) to (VII), and a method for dyeing or printing fiber materials using the reactive dye composition.

In the above formulas (I), (II), (III), (IV), (V), (VI) and (VII), the alkyl group and the alkoxy group represented by $R_1$, $R_2$, $R_5$ and $R_6$ may be, for example, a $C_1$-$C_4$ alkyl group or $C_1$-$C_4$ alkoxy group, such as methyl, ethyl, methoxy, ethoxy, etc. Particularly preferred among them are the methyl group and the methoxy group.

The acylamino group represented by $R_1$ and $R_2$ may be, for example, acetylamino, propionylamino, etc. Particularly preferably, one of $R_1$ and $R_2$ is a hydrogen atom and the other is a ureido group.

As to $R_5$ and $R_6$, one of them is preferably a sulfo group.

As examples of $R_3$, $R_4$, $R_7$, $R_8$, $R_{10}$, $R_{11}$, $R_{12}$, $R_{13}$, $R_{17}$ and $R_{18}$, mention may be made of a hydrogen atom and $C_1$-$C_4$ alkyl groups unsubstituted or substituted with hydroxy, cyano, $C_1$-$C_4$ alkoxy, carboxy, carbamoyl, $C_1$-$C_4$ alkoxycarbonyl, $C_1$-$C_4$ alkylcarbonyloxy, sulfo, sulfamoyl or halogen, such as methyl, ethyl, n-propyl, isopropyl, n-butyl, isobutyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxybutyl, 3,4-dihydroxybutyl, cyanomethyl, 2- cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamonylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, 2-methylcarbonyloxyethyl, 2-ethylcarbonyloxyethyl, 3-methylcarbonyloxypropyl, 3-ethylcarbonyloxypropyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl, 4-sulfamoylbutyl, etc. Particularly preferred among them are a hydrogen atom, methyl group and ethyl group. The alkyl group and the alkoxy group represented by $R_9$ may be, for example, $C_1$–$C_2$ alkoxy groups, preferred among them being the methyl group, ethyl group, methoxy group and ethoxy group. Particularly preferred as $R_{14}$ is the carbonyloxy group

(—CO—).

Particularly preferred as $R_{15}$ is a hydrogen atom. Particularly preferred as $R_{16}$ is a hydrogen atom.

In the present invention, the unsubstituted or substituted phenylene group represented by A, B, D, E, G, J and L in the above formulas (I), (II), (III), (IV), (V), (VI) and (VII) refers to a phenylene group unsubstituted or substituted each independently with one or two substituents selected from the group consisting of $C_1$–$C_4$ alkyl, preferably methyl and ethyl, $C_1$–$C_4$ alkoxy such as methoxy and ethoxy, halogen such as chlorine and bromine, and sulfo, and may be, for example, the groups shown below.

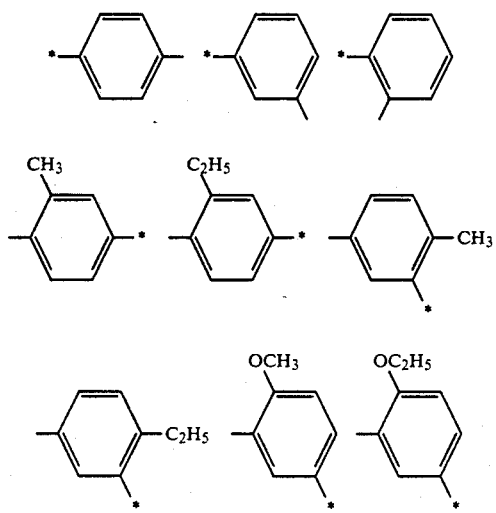

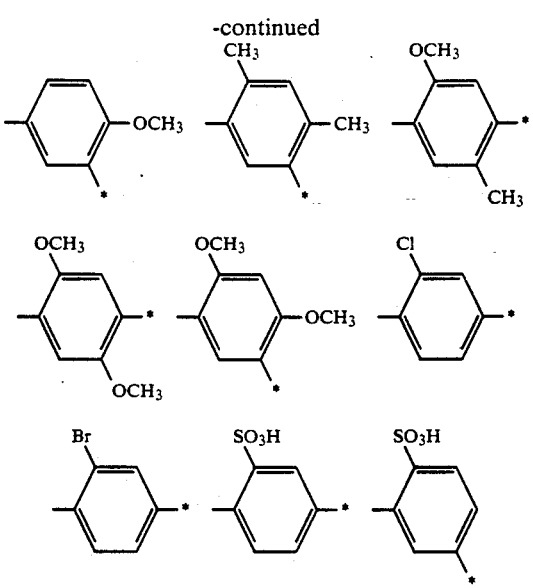

wherein the bond marked with an asterisk means the one connected to —$Y_1$, —$Y_2$, —$Y_3$, —$Y_4$, —$Y_5$, —$Y_6$ or $Y_7$. The naphthylene group may be unsubstituted or substituted with one sulfo group and may be, for example, one of the groups shown below:

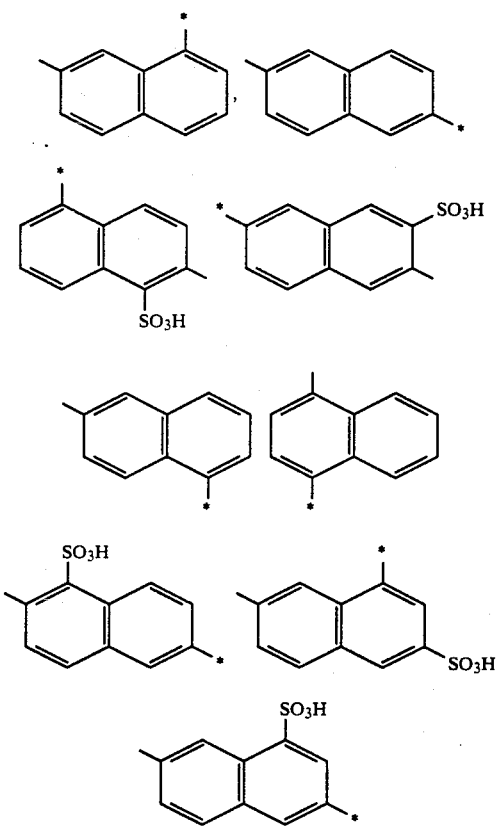

wherein the bond marked with an asterisk means the one connected to —$Y_1$, —$Y_2$, —$Y_3$, —$Y_4$, —$Y_5$, —$Y_6$ or —$Y_7$.

The metal ion of an atomic number of 27–29 represented by Me in the above formula (V) is preferably a copper ion.

As the example of the group capable of being split off by the action of an alkali represented by $Z_1$, $Z_2$, $Z_3$, $Z_4$, $Z_5$, $Z_6$ or $Z_7$, mention may be made of a sulfuric acid ester group, thiosulfuric acid ester group, phosphoric acid ester group, acetic acid ester group, halogen atom, and the like.

The alkyl group and the alkoxy group referred to in the present invention respectively mean a $C_1$-$C_4$ alkyl and alkoxyl group, unless otherwise specified.

The reactive dyes represented by the formula (I) are already known to the art from Japanese Patent Application Kokai (Laid-open) No. 56-15481, those represented by the formula (II) from Japanese Patent Application Kokai (Laid-open) No. 61-155469, those represented by the formula (III) from Japanese Patent Application Kokai (Laid-open) No. 50-178, those represented by the formula (IV) from Japanese Patent Application Kokai (Laid-.open) No. 57-89679, those represented by the formula (V) from Japanese Patent Application Kokai (Laid-open) No. 59-15451, those represented by the formula (VI) from Japanese Patent Publication No. 26-1989 and those represented by the formula (VII) from Japanese Patent Application Kokai (Laid-open) No. 56-128380. These reactive dyes may be prepared according to the methods described in these patent specifications.

The reactive dyes represented by the formula (I) used in the present invention are not particularly restricted but are preferably those represented by the formula (VIII) in the form of free acid

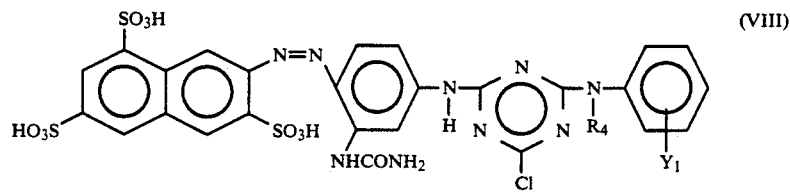

wherein $R_4$ and $Y_1$ are as defined above, and more preferably the one represented by the formula (XV) in the form of free acid

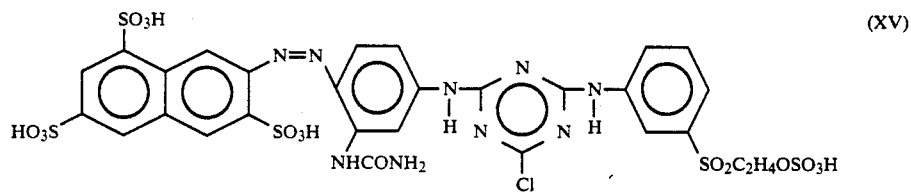

The reactive dyes represented by the formula (II) used in the present invention are not particularly restricted but are preferably those represented by the formula (IX) in the form of free acid

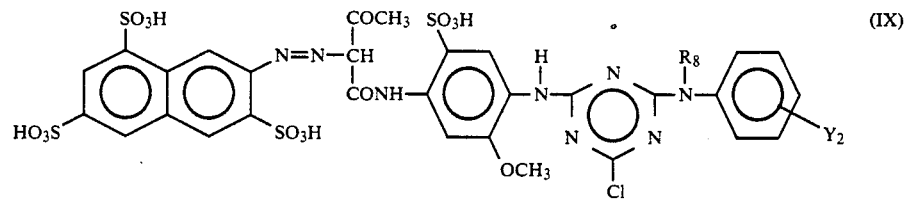

wherein $R_8$ and $Y_2$ are as defined above, and more preferably those represented by the formula (XVI) in the form of free acid

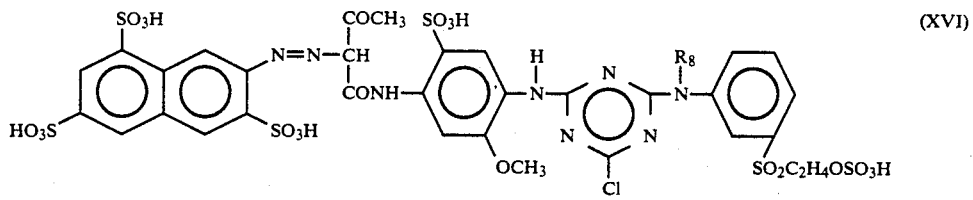

wherein $R_8$ is as defined above and preferably a hydrogen atom, methyl group or ethyl group.

The reactive dyes represented by the formula (III) are not particularly limited but are preferably those represented by the formula (X) in the form of free acid

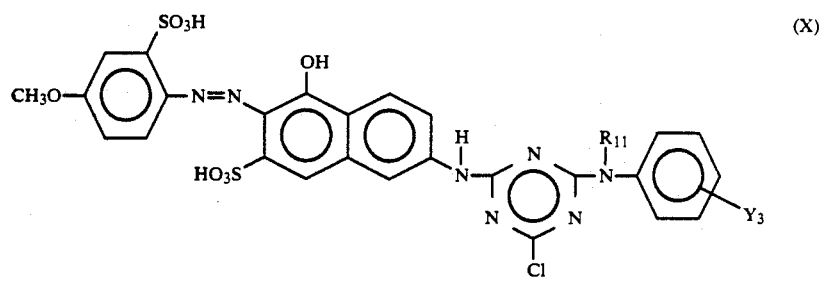
(X)

wherein $R_{11}$ and $Y_3$ are as defined above, and more preferably the one represented by the formula (XVII) in the form of free acid wherein $R_{12}$ and $Y_4$ are as defined above, and more preferably the one represented by the formula (XVIII) in the form of free acid

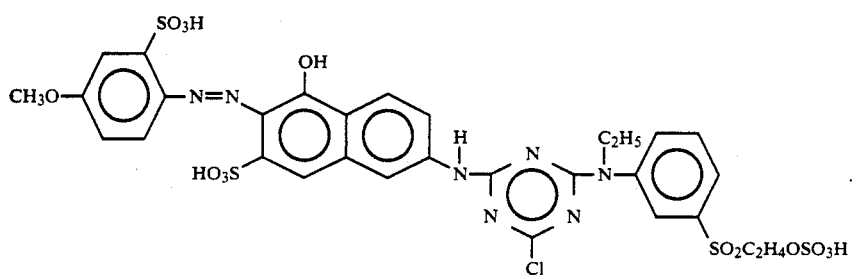
(XVII)

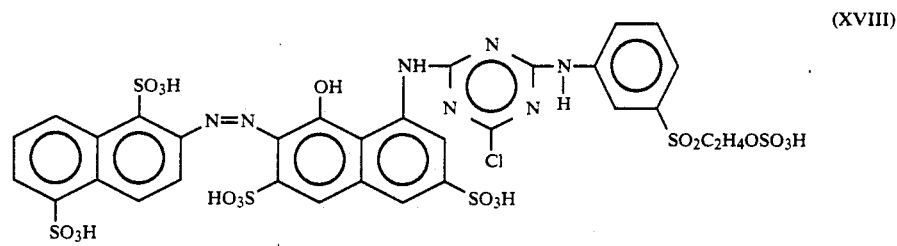
(XVIII)

The reactive dyes represented by the formula (IV) are not particularly limited but are preferably those represented by the formula (XI) in the form of free acid The reactive dyes represented by the formula (V) are not particularly limited but are preferably those represented by the formula (XII) in the form of free acid

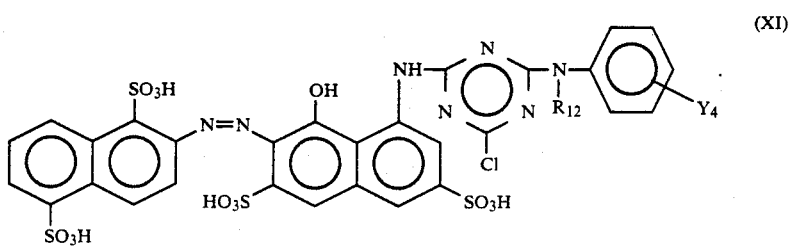
(XI)

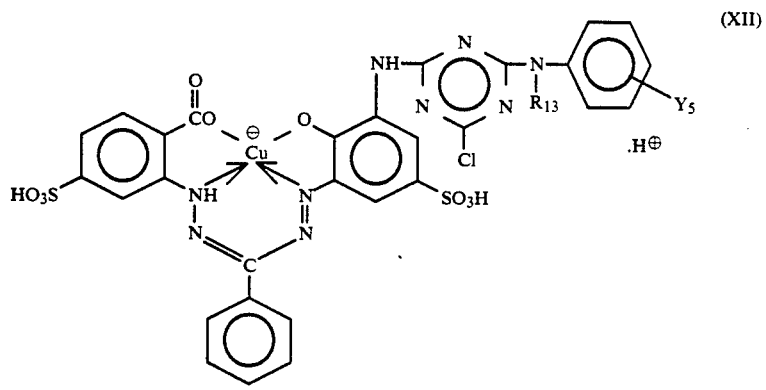

(XII)

wherein $R_{13}$ and $Y_5$ are as defined above, and more preferably the one represented by the formula (XIX) in the form of free acid

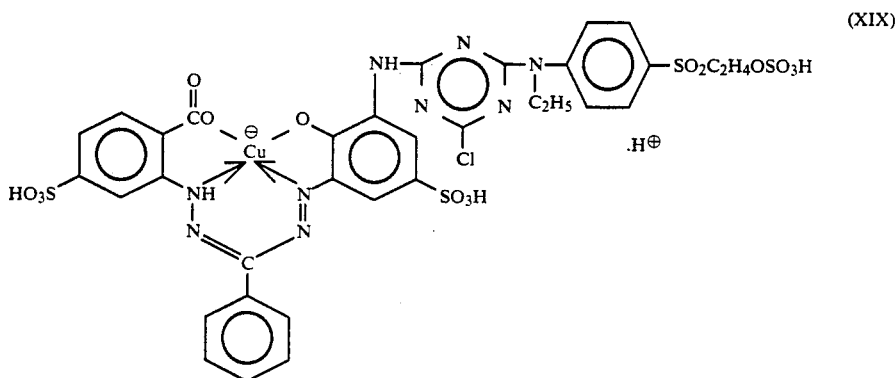

(XIX)

The reactive dyes represented by the formula (VI) used in the present invention are not particularly limited, but are preferably those represented by the formula (XIII) in the form of free acid

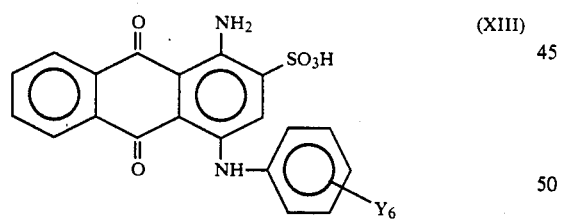

(XIII)

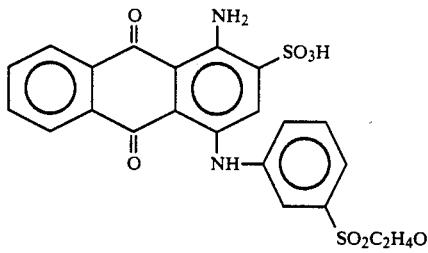

(XX)

The reactive dyes represented by the formula (VII) used in the present invention are not particularly limited but are preferably those represented by the formula (XIV) in the form of free acid

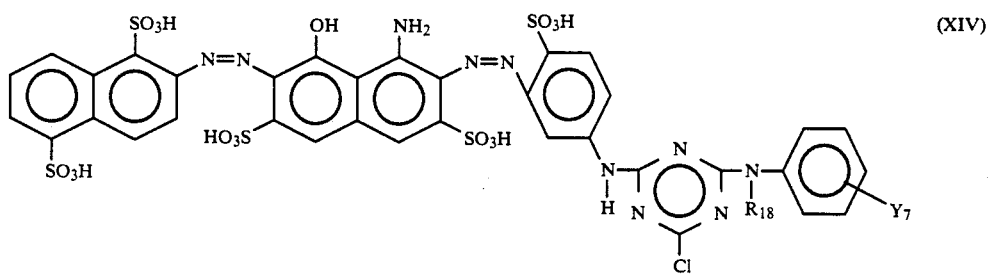

(XIV)

wherein $Y_6$ is as defined above, and more preferably the one represented by the formula (XX) in the form of free acid wherein $R_{18}$ and $Y_7$ are as defined above, and more preferably the one represented by the formula (XXI) in the form of free acid

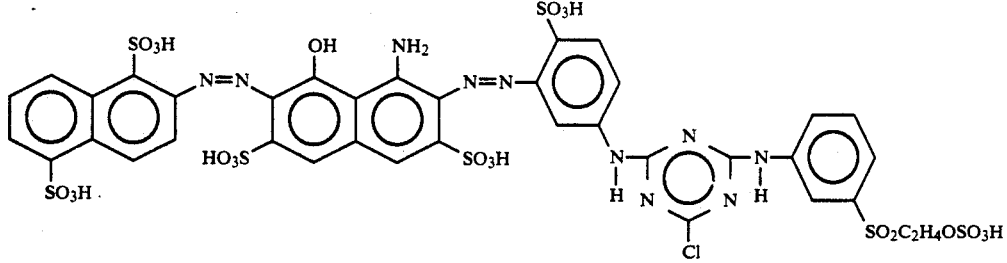

Although all formulas (I) to (XXI) are represented in the form of free acid for convenience, it is natural that the reactive dyes used in the present invention may be in the form of free acid or the salt thereof. In the present invention, those preferably in the form of alkali metal salt or alkaline earth metal salt, more preferably sodium salt, potassium salt or lithium salt are used.

In the present invention, the reactive dyes are not particularly restricted as to the method of mixing them with one another. They may be either mixed in advance to being used in dyeing or mixed at the time of dyeing.

The yellow reactive dye preferably comprises two reactive dyes each selected respectively from one of the two groups of reactive dyes represented respectively by the formulas (I) and (II), particularly by the formulas (VIII) and (IX), more particularly by the formulas (XV) and (XVI).

The red reactive dye preferably comprises two reactive dyes each selected respectively from one of the two groups of reactive dyes represented respectively by the formulas (III) and (IV), particularly by the formula (X) and (XI), more particularly by the formulas (XVII) and (XVIII).

The blue reactive dye preferably comprises three reactive dyes each selected respectively from one of the three groups of reactive dyes represented respectively by the formulas (V) to (VII), particularly by the formulas (XII) to (XIV), more particularly by the formulas (XIX) to (XXI).

In the yellow, red and blue reactive dyes, when each dye comprises two or more reactive dyes, the mixing ratio of one reactive dye to the other one reactive dye or to the other two or more respective reactive dyes is each independently preferably 1 to 1-30 by weight.

The fiber reactive dye composition of the present invention may contain, if desired, inorganic salts such as sodium sulfate, sodium chloride, etc., dispersing agents such as β-naphthalenesulfonic acid—formaldehyde condensation products, methylnaphthalene-sulfonic acid—formaldehyde condensation products, acetylaminonaphthol based compounds, etc., non-dusting agents such as di-2-ethylhexyl terephthalate, etc., pH buffering agents such as sodium acetate, sodium phosphate, etc., water softness such as polyphosphates, etc., conventional dye auxiliary agents, other dyes, etc.

The fiber reactive dye composition of the present invention is not particularly ristricted as to its form and may be, for example, in the form of powder, granule or liquid.

The fiber reactive dye composition of the present invention is useful for dyeing or printing fiber materials, particularly cellulose based fiber materials and fiber materials containing the same. The cellulose based fiber materials are not particularly restricted and include, for example, natural or regenerated cellulose fibers, such as cotton, linen, hemp, jute, ramie fiber, viscose rayon, Benberg, and blends of these fibers. As the example of the fiber material containing cellulose based fiber, mention may be made of cotton-polyester, cotton-nylon and cotton-acrylics blends.

The fiber reactive dye composition of the present invention may be used for dyeing and printing by conventional methods. The exhaustion dyeing may be carried out, for example, in the presence of a known inorganic neutral salt such as sodium sulfate, sodium chloride, etc., and a known alkali such as sodium carbonate, sodium bicarbonate, sodium hydroxide, trisodium phosphate etc., used each alone or in combination. The amount of the inorganic neutral salt and the alkali to be used is not critical, but is preferably at least 1 g/l and may be 100 g/l or more. The inorganic neutral salt and the alkali may be added to a dyebath either all at once or dividedly in a conventional manner. Further, a dye auxiliary agent, such as a leveling agent, retarder, dyebath lubricants, etc., may be used together in a conventional manner, but the dye auxiliary agent is not limited thereto. The dyeing temperature is usually 40°-90° C., preferably 40°-70° C. The cold batch-up dyeing may be carried out, for example, after padding a fiber material with a conventional inorganic neutral salt, such as sodium sulfate, sodium chloride, etc., and a conventional alkali, such as sodium hydroxide, sodium silicate, etc., by allowing the material to stand in a sealed packaging material at a temperature of 0°-90° C., preferably 10°-40° C. The continuous dyeing may be carried out, for example, by the one-bath padding method comprising padding a fiber material in a conventional manner with a dye-padding liquor containing a known alkali such as sodium carbonate, sodium bicarbonate, sodium hydroxide, etc., followed by dry-heating or steaming, or the two-bath padding method which comprises dye-padding a fiber material and then padding the material with a conventional inorganic neutral salt, such as sodium sulfate, sodium chloride, etc., and a known alkali, such as sodium hydroxide, sodium silicate, etc., followed by dry-heating or steaming in a conventional manner. However, the methods of dyeing are not limited to these. The printing may be carried out, for example, by the one-phase printing method which comprises printing a fiber material with a printing paste containing a conventional alkali, such as sodium carbonate, sodium bicarbonate, etc., followed by drying and then steaming, or the two-phase printing method which comprises printing a fiber material with a printing paste and then putting the material into an aqueous solution containing a conventional inorganic neutral salt, such as sodium sulfate, sodium chloride, etc., and a conventional alkali, such as sodium hydroxide, sodium silicate, etc., at a high temperature of at least 80° C. In the dyeing or printing, a conventional leveling agent, retarder or dyebath lubricants may also be used additionally in a conventional manner.

The alkali suitably used for fixing the fiber reactive dye composition of the present invention onto the cellulose fiber is, for example, a water-soluble basic salt of an alkali or alkaline earth metal of an inorganic or organic acid or a compound capable of liberating alkali on heating. Examples thereof include alkali metal hydroxides and alkali metal salts of a weak or medium-strength inorganic or organic acid. Of these, particularly preferred are sodium salts and potassium salts. As the example of such acid binding agents, mention may be made of sodium hydroxide, potassium hydroxide, sodium bicarbonate, sodium carbonate, sodium formate, potassium carbonate, primary, secondary or tertiary sodium phosphate, sodium silicate, sodium trichloroacetate, etc.

The fiber reactive dye composition of the present invention exhibits superior dye performance characteristics including excellent compatibility, leveling property and reproducibility and further good build-up property when used for dyeing or printing fiber materials, and gives dyed or printed products excellent in various fastness properties.

The present invention is described in more detail with reference to the following Examples, which however are not to be construed as limiting the scope of the present invention. In the Examples, % and parts are respectively by weight unless otherwise specified.

EXAMPLE 1

A knitted fabric, 100 parts, made of cotton fiber was placed in a winch dyeing apparatus, which was then set at a liquor ratio of 1:15 and a water temperature of 60° C.

Then 0.8 part of a dye represented by the formula (1) in the form of free acid dissolved in advance

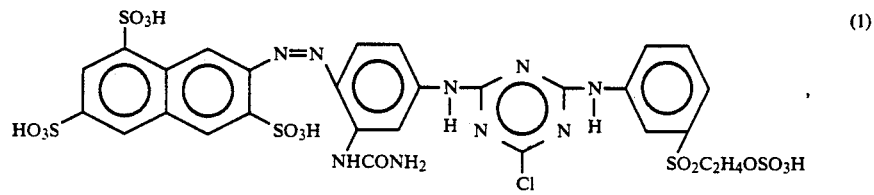
(1)

0.8 part of a dye represented by the formula (2) in the form of free acid dissolved in advance

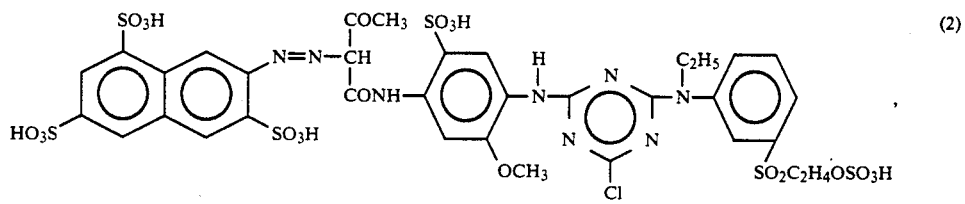
(2)

0.5 part of a dye represented by the formula (3) in the form of free acid dissolved in advance

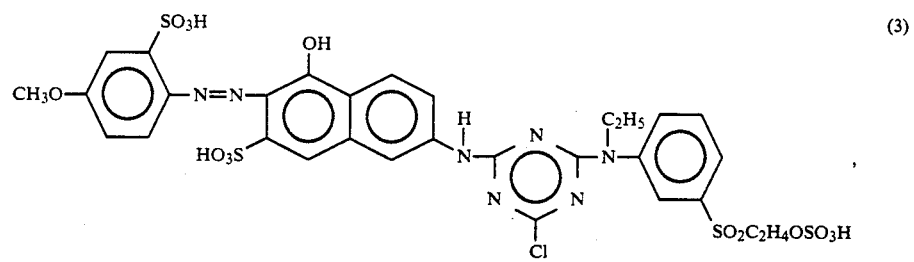
(3)

1.1 parts of a dye represented by the formula (4) in the form of free acid dissolved in advance

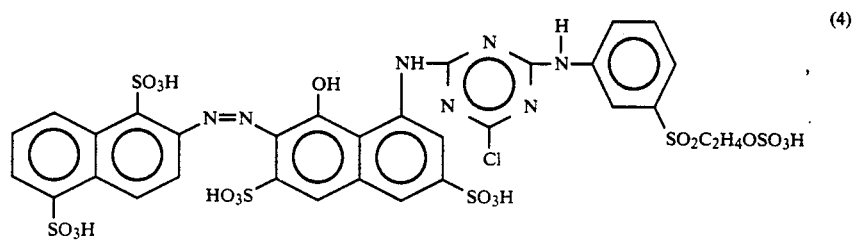
(4)

0.2 part of a dye represented by the formula (5) in the form of free acid dissolved in advance

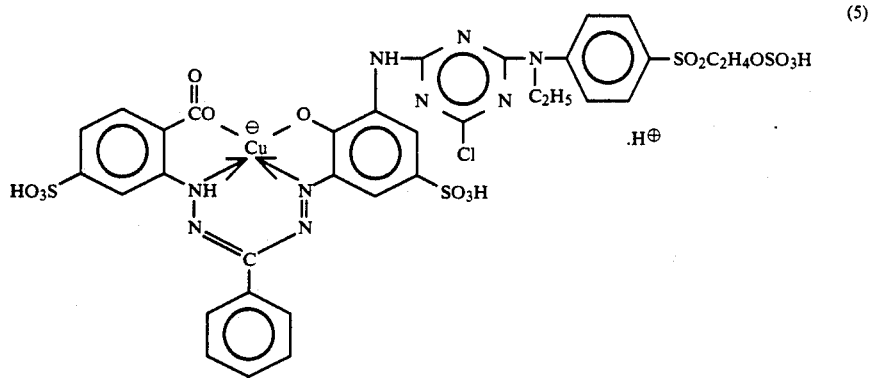
(5)

0.6 part of a dye represented by the formula (6) in the form of free acid dissolved in advance

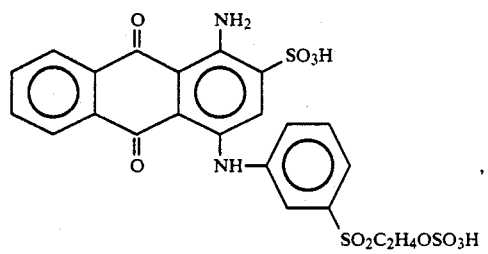
(6)

0.6 part of a dye represented by the formula (7) in the form of free acid dissolved in advance the dyes in the course of dying, the respective dyes showed uniform dyeing rates and thus a good compatibility. The dyed product was finished by washing in a conventional way. The dyed product thus obtained was of uniform reddish deep brown color free from uneveness and showed an excellent build-up property. The dyed product showed good fastness to light, perspiration-light, chlorinated water and washing.

Further, the dyeing process described above was carried out repeatedly. A good reproducibility of dyeing was obtained in respective runs.

EXAMPLE 2

A knitted fabric, 100 parts, made of rayon fiber was placed in a low liquor ratio type jet dyeing apparatus, which was then set at a bath ratio of 1:6 and a water

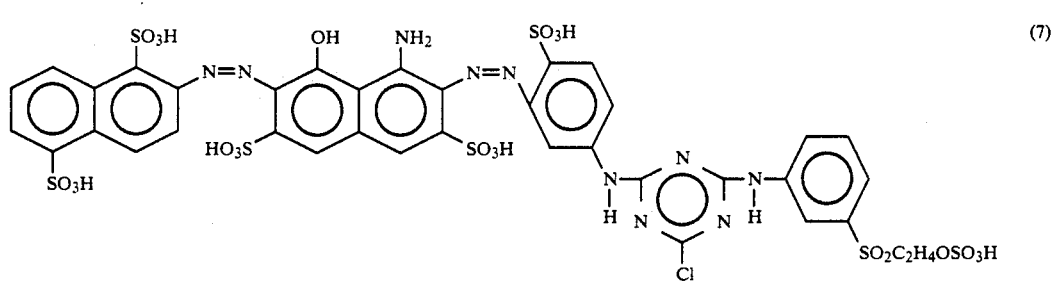
(7)

and 75 part of sodium sulfate were added to the bath by a conventional method. Thereafter, the fabric was treated at the pre-set temperature for 20 minutes and then 30 parts of sodium carbonate was added to the bath in a conventional manner. Then the fabric was treated at the pre-set temperature for 60 minutes to complete the dyeing. Upon examination of the compatibility of temperature of 60° C.

Then, 0.1 part of a dye represented by the formula (8) in the form of free acid dissolved in advance

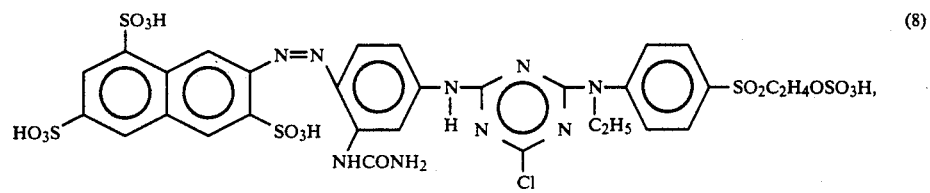
(8)

0.3 part of a dye represented by the formula (9) in the form of free acid dissolved in advance

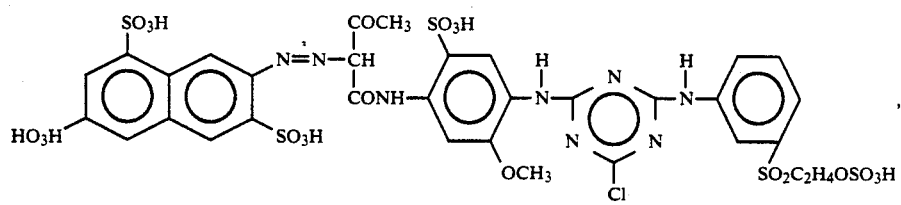

(9)

0.2 part of a dye represented by the formula (10) in the form of free acid dissolved in advance

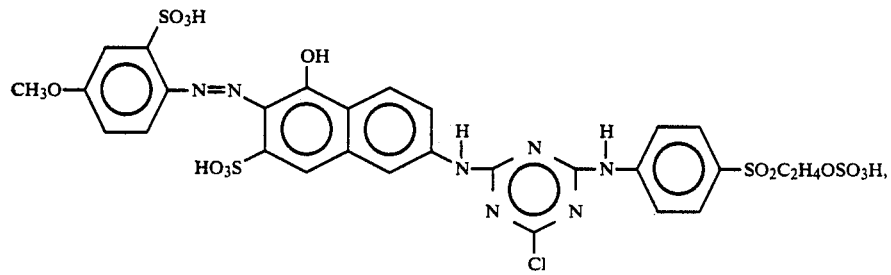

(10)

0.2 part of a dye represented by the formula (11) in the form of free acid dissolved in advance

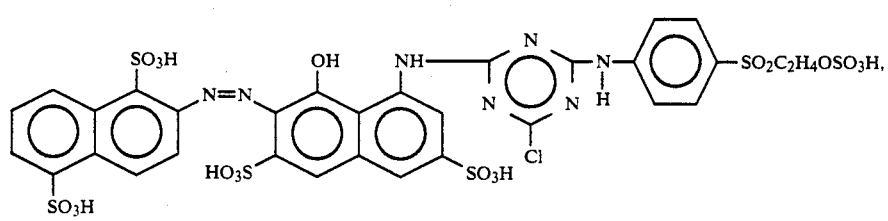

(11)

0.9 part of a dye represented by the formula (12) in the form of free acid dissolved in advance

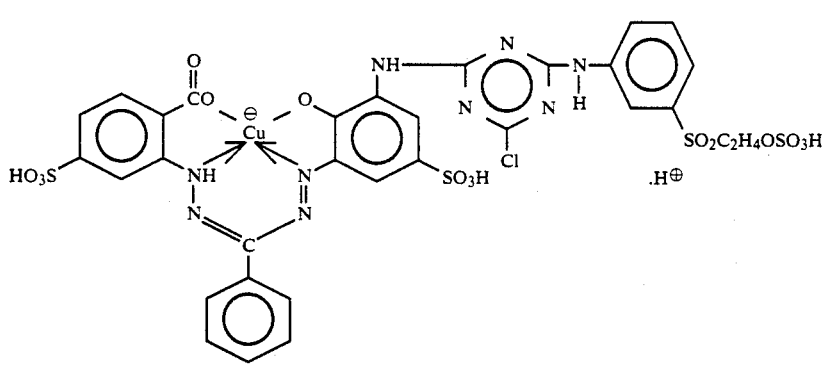

(12)

0.9 part of a dye represented by the formula (13) in the form of free acid dissolved in advance

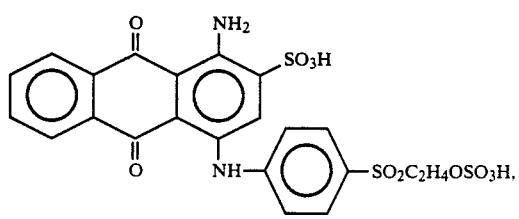

(13)

0.4 part of 7-acetylamino-8-naphthol-3-sulfonic acid and 20 parts of sodium sulfate were added to the bath by a conventional method. Thereafter, the fabric was treated at the pre-set temperature for 20 minutes, and then 2.5 parts of sodium carbonate and 0.5 part by volume of a sodium hydroxide solution of 38 degree Baumé were added to the bath. The fabric was then treated at the pre-set temperature for 40 minutes to complete the dyeing. Upon examination of the compatibility of the dyes in the course of dyeing, the respective dyes showed uniform dyeing rates and thus a good compatibility. The dye product was finished by washing in a conventional way. The dyed product thus obtained was of uniform red-tinged bluish gray color free from unevenness and showed an excellent build-up property. The dyed product showed good fastness to light, perspiration-light, chlorinated water and washing.

Further, the dyeing process described above was carried out repeatedly. A good reproducibility of dyeing was obtained in respective runs.

EXAMPLE 3

Yarn made of cotton fiber, 100 parts, was placed in a cheese dyeing apparatus, which was then set at a liquor ratio of 1:10 and a water temperature of 65° C.

Then, 1.6 parts of a dye represented by the formula (14) in the form of free acid dissolved in advance

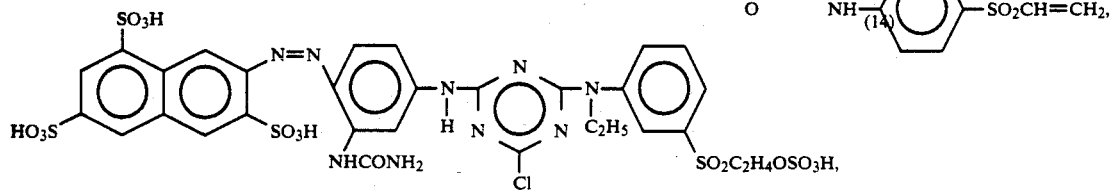

0.4 part of a dye represented by the formula (15) in the form of free acid dissolved in advance

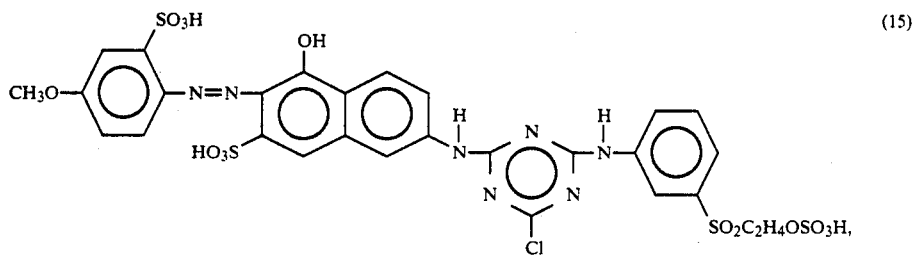

0.2 part of a dye represented by the formula (16) in the form of free acid dissolved in advance

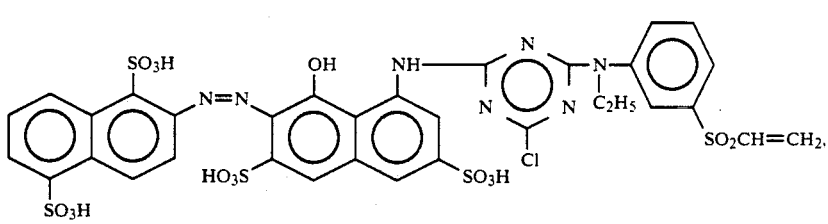

0.4 part of a dye represented by the formula (17) in the form of free acid dissolved in advance 0.2 part of a dye represented by the formula (18) in the form of free acid dissolved in advance

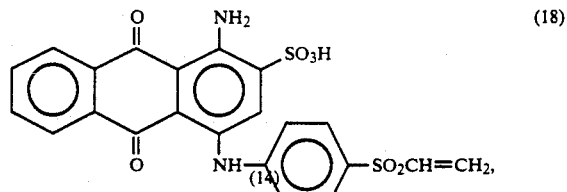

0.4 part of a dye represented by the formula (19) in the form of free acid dissolved in advance

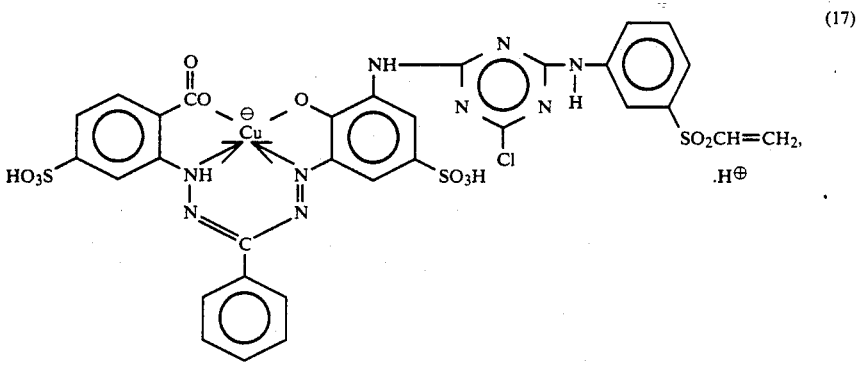

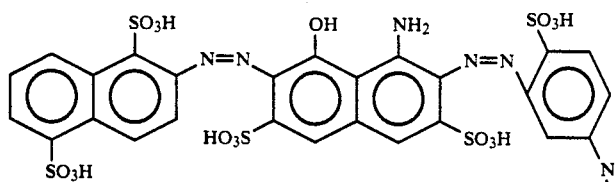

(19)

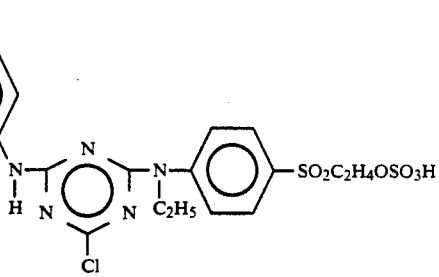

(22)

and 50 parts of sodium chloride were added to the bath by a conventional method. Thereafter, the yarn was treated at the pre-set temperature for 30 minutes and then 10 parts of trisodium phosphate was added to bath in a conventional manner. The yarn in a form of cheese was then treated at the pre-set temperature for 60 minutes to complete the dyeing. Upon examination of the compatibility of the dyes in the course of dyeing, the respective dyes showed uniform dyeing rates and thus a good compatibility. The dyed yarn was finished by washing in a conventional manner. The dyed yarn thus obtained was of uniform deep dark green color with no color difference between the outer and the inner layers of the cheese and showed a good build-up property. The dyed product showed good fastness to light, perspiration-light, chlorinated water and washing.

Further, the dyeing process described above was carried out repeatedly. A good reproducibility of dyeing was obtained in respective runs.

EXAMPLE 4

A blended knitted fabric, 200 parts, made of 50% of cotton fiber and 50% of polyester fiber, was placed in a high pressure jet dyeing apparatus, which was then set at a liquor ratio of 1:10 and a water temperature of 80° C. and adjusted to pH 5 by use of acetic acid.

A liquid dispersion containing 0.5 part of a disperse dye represented by the formula (20) thoroughly dispersed in water beforehand

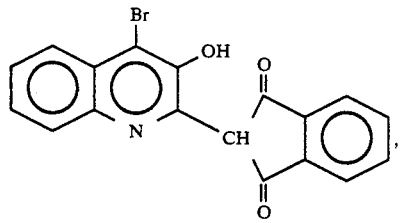

(20)

0.8 part of a disperse dye represented by the formula (21) thoroughly dispersed in water beforehand

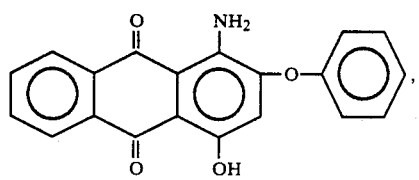

(21)

0.2 part of a disperse dye represented by the formula (22) thoroughly dispersed in water beforehand and 2 parts of a dispersant (Sumipon TF, a trade name, mfd. by Sumitomo Chemical Co., Ltd.) was used to raise the temperature up to 130° C. in 40 minutes and dye the polyester-side fiber at the temperature for 40 minutes. Then the dye liquor was discharged. Thereafter, water was supplied to the apparatus to give a liquor ratio of 1:10 and a water temperature of 60° C.

Then, 0.6 part of a dye represented by the formula (1) in the form of free acid dissolved in advance, 1.0 part of a dye represented by the formula (2) in the form of free acid dissolved in advance, 0.3 part of a dye represented by the formula (3) in the form of free acid dissolved in advance, 0.7 part of a dye represented by the formula (4) in the form of free acid dissolved in advance, 0.2 part of a dye represented by the formula (5) in the form of free acid dissolved in advance, 0.5 part of a dye represented by the formula (6) in the form of free acid dissolved in advance, 0.3 part of a dye represented by the formula (7) in the form of free acid dissolved in advance and 80 parts of sodium sulfate were added to the bath by a conventional method. Thereafter, the fabric was treated at the pre-set temperature for 20 minutes, and 10 parts of Espolon K-21 (mfd. by Ippo-sha Co., Ltd.) was added to the bath in a conventional way. The fabric was then treated at the pre-set temperature for 60 minutes to complete the dyeing. Upon examination of the compatibility of the dyes in the course of dyeing, the respective dyes showed uniform dyeing rates and thus a good compatibility. The dyed product was finished by washing in a conventional manner. The dyed product thus obtained was of uniform brown color free from unevenness and showed a good build-up property. The dyed product showed good fastness to light, perspiration-light, chlorinated water and washing.

Further, the dyeing process described above was carried out repeatedly. A good reproducibility of dyeing was obtained in respective runs.

EXAMPLE 5

A knitted fabric, 100 parts, made of cotton fiber was placed in a winch dyeing apparatus, which was then set at a liquor ratio of 1:15 and a water temperature of 60° C.

Then, 0.1 part of a dye represented by the formula (23) in the form of free acid dissolved in advance

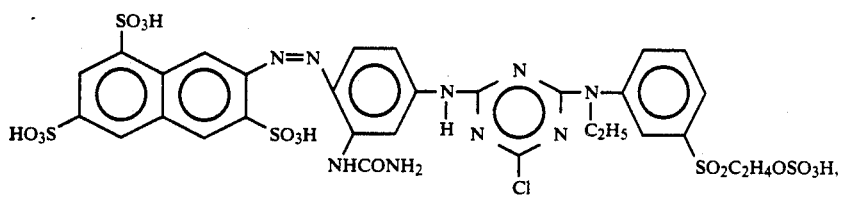

(23)

0.1 part of a dye represented by the formula (24) in the form of free acid dissolved in advance

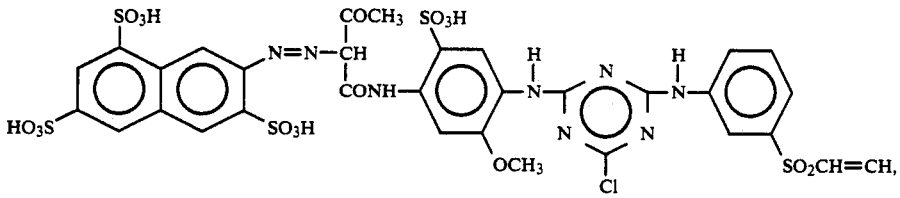

(24)

0.3 part of a dye represented by the formula (25) in the form of free acid dissolved in advance

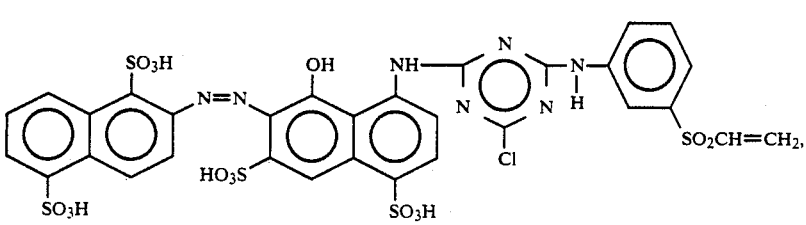

(25)

1.5 parts of a dye represented by the formula (26) in the form of free acid dissolved in advance

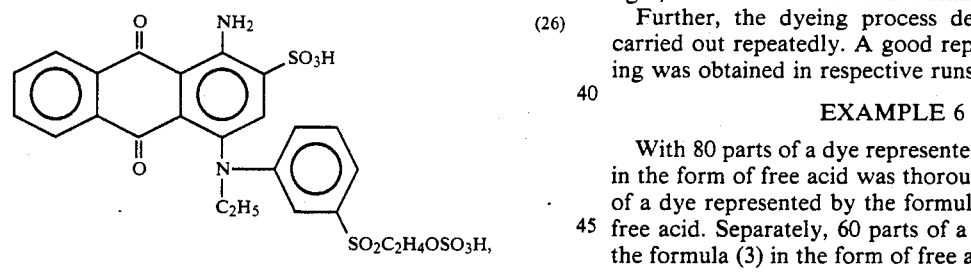

(26)

0.9 part of a dye represented by the formula (27) in the form of free acid dissolved in advance

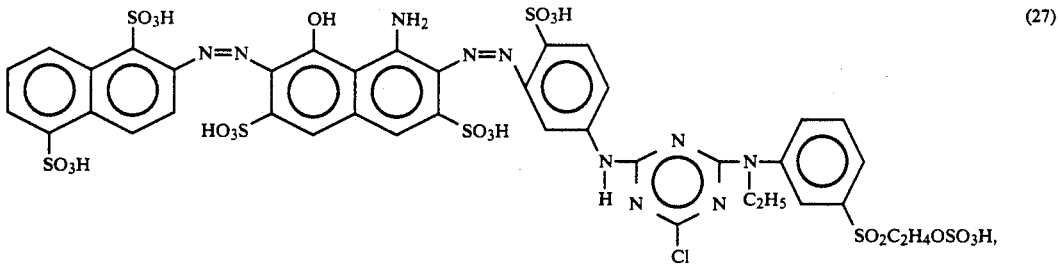

(27)

and 75 parts of sodium sulfate were added to the bath by a conventional method. Then the fabric was treated at the pre-set temperature for 20 minutes, and 30 parts of sodium carbonate was added to the bath in a conventional manner. The fabric was then treated at the pre-set temperature for 60 minutes to complete the dyeing. Upon examination of the compatibility of the dyes in the course of dyeing, the respective dyes showed uniform dyeing rates and thus a good compatibility. The dyed product was finished by washing in a conventional manner. The dyed product thus obtained was of uniform bluish gray color free from unevenness. The dyed product showed good fastness to light, perspiration-light, chlorinated water and washing.

Further, the dyeing process described above was carried out repeatedly. A good reproducibility of dyeing was obtained in respective runs.

EXAMPLE 6

With 80 parts of a dye represented by the formula (1) in the form of free acid was thoroughly mixed 20 parts of a dye represented by the formula (2) in the form of free acid. Separately, 60 parts of a dye represented by the formula (3) in the form of free acid was thoroughly mixed with 40 parts of a dye represented by the formula (4) in the form of free acid. Further, 15 parts of a dye represented by the formula (5) in the form of free acid was thoroughly mixed with 40 parts of a dye represented by the formula (6) in the form of free acid and 45 parts of a dye represented by the formula (7) in the form of free acid. The reactive dye compositions thus obtained were dissolved respectively in an amount of 15, 20 and 1 part in hot water and cooled to 25° C. To the resulting solution were added 1 part of sodium alginate, 10 parts of sodium m-nitrobenzenesulfonate and 20 parts of sodium hydrogen carbonate, and water was further added thereto to make up the total into 1000 parts by volume at 25° C. Immediately thereafter, a cotton woven fabric was pad-dyed by using the liquid obtained above as the padding liquor. The pad-dyed cotton fabric was dried at 120° C. for 2 minutes and then steamed at 100° C. for 5 minutes to fix the dyes. The dyed product obtained was of uniform reddish brown color and showed an excellent build-up property. The dyed product showed good fastness to light, perspiration-light, chlorinated water and washing.

Further, the dyeing process described above was carried out repeatedly. A good reproducibility of dyeing was obtained in respective runs.

EXAMPLE 7

With 35 parts of a dye represented by the formula (8) in the form of free acid were thoroughly mixed 10 parts of a dye represented by the formula (9) in the form of free acid, 35 parts of a dye represented by the formula (10) in the form of free acid, 10 parts of a dye represented by the formula (11) in the form of free acid, 5 parts of a dye represented by the formula (12) in the form of free acid and 5 parts of a dye represented by the formula (13) in the form of free acid. Then, 60 parts of the resulting reactive dye composition was dissolved in hot water, and 20 parts of sodium alginate, 10 parts of sodium m-nitrobenzene-sulfonate, 20 parts of sodium hydrogen carbonate and further water were added thereto to make up the total into 1000 parts at 20° C. Immediately thereafter, the mixture obtained above was used as the printing paste to print a cotton woven fabric, which was then dried and subsequently steamed at 100° C. for 5 minutes to fix the dyes. The dyed product obtained was finished by washing and drying in a conventional manner. The printed fabric thus obtained was of uniform deep orange color and showed an excellent build-up property.

The printing process described above was carried out repeatedly. A good reproducibility of printing was obtained in respective runs.

EXAMPLES 8 TO 11

A series of dyeing was carried out in the same manner as in Example 1 except that the reactive dyes shown in Tables 1 to 4 were used. The dyed products obtained were respectively uniform and showed an excellent build-up property. The dyed products showed good fastness to light, perspiration-light, washing and chlorinated water. Further, when the dyeing process described above were carried out repeatedly, a good reproducibility of dyeing was obtained in respective runs.

TABLE 1

| | Structural formula | Compounded amount (part) | Hue of dyed product |
|---|---|---|---|
| Example 8 | (azo dye with naphthalene-SO₃H/HO₃S, azo linkage to phenyl-NHCONH₂, NH-triazine(Cl)-NH-phenyl-SO₂CH=CH₂) | 0.5 | Reddish purple |
| | (azo dye with naphthalene-SO₃H/HO₃H, N=N-CH(COCH₃)-CONH-phenyl(SO₃H, OCH₃)-NH-triazine(Cl)-N(C₂H₅)-phenyl-SO₂CH=CH₂) | 0.02 | |
| | (azo dye: phenyl(SO₃H, CH₃O)-N=N-naphthalene(OH, HO₃S)-NH-triazine(Cl)-N(C₂H₅)-phenyl-SO₂CH=CH₂) | 0.1 | |
| Example 8 | (azo dye: naphthalene(SO₃H, SO₃H)-N=N-naphthalene(OH, HO₃S, SO₃H)-NH-triazine(Cl)-N(C₂H₅)-phenyl-SO₂C₂H₄OSO₃H) | 1.6 | Reddish purple |

TABLE 1-continued

| | Structural formula | Compounded amount (part) | Hue of dyed product |
|---|---|---|---|
| Example 8 | (copper complex azo dye structure with SO₂C₂H₄OSO₃H·H⊕ group) | 1.0 | Reddish purple |
| | (anthraquinone dye structure with SO₂C₂H₄OSO₃H group) | 0.05 | |
| Example 8 | (disazo dye structure with SO₂CH=CH₂ group) | 0.05 | Reddish purple |

TABLE 2

| | Structural formula | Compounded amount (part) | Hue of dyed product |
|---|---|---|---|
| Example 9 | (azo dye with triazine-Cl, NHCONH₂, SO₂CH=CH₂ groups) | 0.83 | Gray |
| | (azo dye with triazine-Cl, OCH₃, COCH₃, CONH, SO₂CH=CH₂ groups) | 0.03 | |
| | (naphthol azo dye with triazine-Cl, OH, SO₂C₂H₄OSO₃H groups) | 0.02 | Gray |
| Example 9 | (naphthol azo dye with triazine-Cl, OH, SO₂CH=CH₂ groups) | 0.41 | |

TABLE 2-continued

| Example | Structural formula | Compounded amount (part) | Hue of dyed product |
|---|---|---|---|
| Example 9 | [Cu-complex azo dye structure with SO₂C₂H₄OSO₃H·H⊕ group, N-C₂H₅, Cl, triazine, SO₃H, HO₃S substituents] | 1.2 | Gray |
| | [Anthraquinone dye: 1-amino-2-sulfo-4-(3-vinylsulfonylanilino)anthraquinone with SO₂CH=CH₂] | 0.06 | |
| Example 9 | [Disazo dye with naphthalene, OH, NH₂, SO₃H, HO₃S groups, triazine with Cl, NH-phenyl-SO₂C₂H₄OSO₃H] | 0.08 | Gray |

TABLE 3

| | Structural formula | Compounded amount (part) | Hue of dyed product |
|---|---|---|---|
| Example 10 | (structure) | 1.1 | Deep green |
| | (structure) | 1.6 | |
| Example 10 | (structure) | 0.01 | Deep green |
| | (structure) | 0.01 | |

TABLE 3-continued
| | Structural formula | Compounded amount (part) | Hue of dyed product |
|---|---|---|---|
| Example 10 |  | 0.6 | Deep Green |
| |  | 0.6 | |
| Example 10 |  | 2.3 | Deep green |

TABLE 4

| | Structural formula | Compounded amount (part) | Hue of dyed product |
|---|---|---|---|
| Example 11 | [structure] | 0.15 | Reddish blue |
| | [structure] | 0.01 | |
| Example 11 | [structure] | 0.02 | Reddish blue |
| | [structure] | 0.32 | |

TABLE 4-continued
| | Structural formula | Compounded amount (part) | Hue of dyed product |
|---|---|---|---|
| Example 11 | 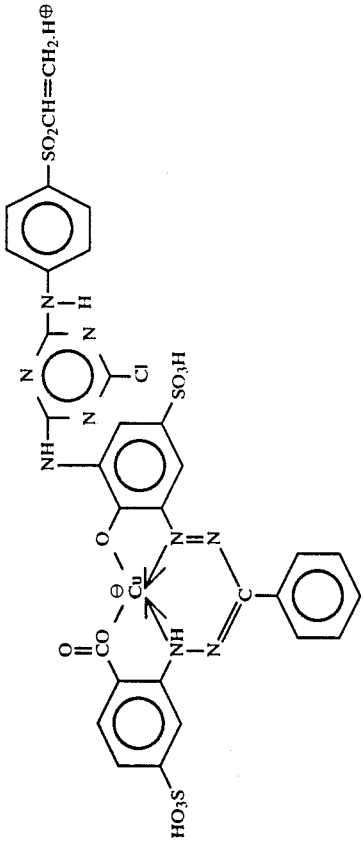 | 0.2 | Reddish blue |
| | | 3.1 | |
| Example 11 | 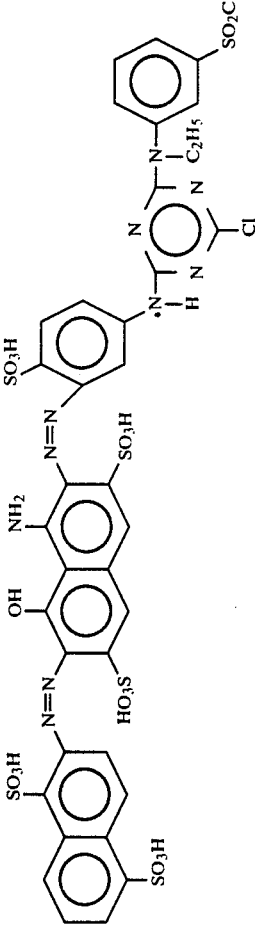 | 0.15 | Reddish blue |

EXAMPLE 12

A knitted fabric, 100 parts, made of rayon fiber was placed in a low liquor ratio jet dyeing apparatus, which was then set at a liquor ratio of 1:6 and a water temperature of 60° C. Then, 0.04 part of a dye represented by the formula (8) in the form of free acid dissolved in advance, 0.43 part of a dye represented by the formula (9) in the form of free acid dissolved in advance, 0.1 part of a dye represented by the formula (10) in the form of free acid dissolved in advance, 0.02 part of a dye represented by the formula (28) in the form of free acid dissolved in advance

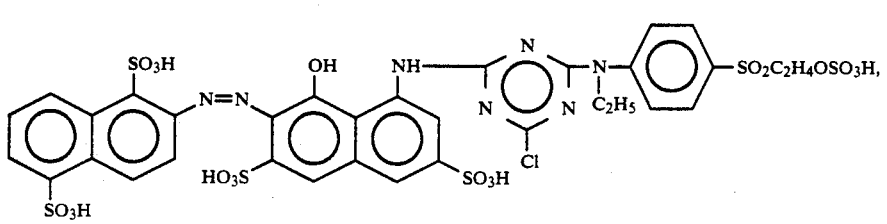
(28)

0.09 part of a dye represented by the formula (29) in the form of free acid dissolved in advance

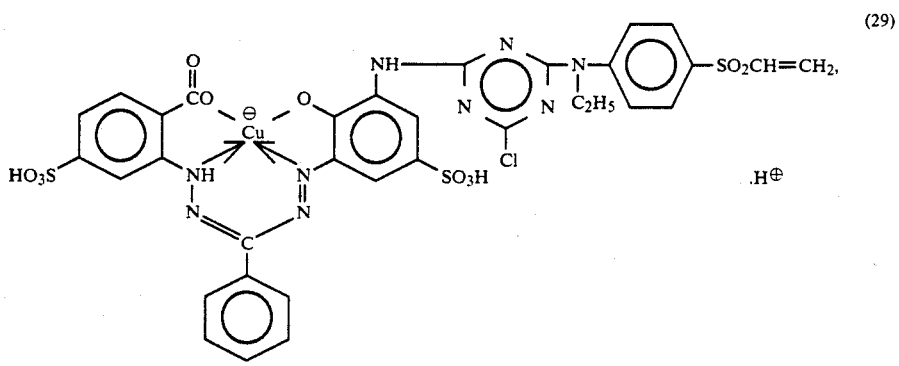
(29)

0.03 part of a dye represented by the formula (30) in the form of free acid dissolved in advance

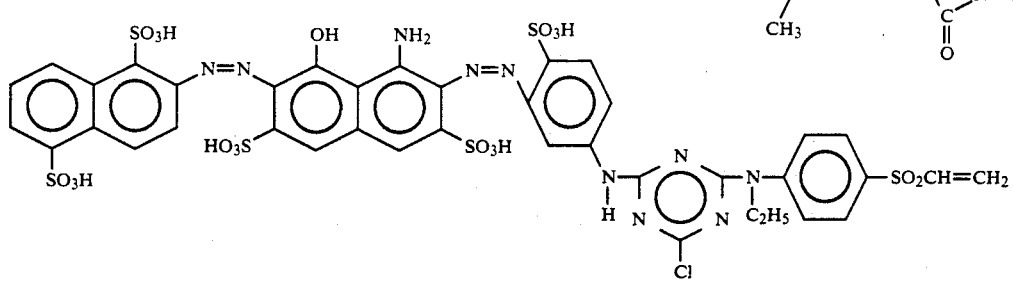
(30)

and 0.5 part of a methylnaphthalene sulfonic acid-formaldehyde condensate product were added to the bath in a conventional manner. Succeedingly, the fabric was treated in the bath at the pre-set temperature for 20 minutes and then 2.5 parts of sodium carbonate and 0.5 part by volume of a sodium hydroxide solution of 38 degree Baumé were added to the bath. Then the fabric was treated in the bath at the pre-set temperature for 40 minutes to complete the dyeing. Upon examination of the compatibility of dyes in the course of dyeing, the respective dyes showed uniform dyeing rates and thus a good compatibility. The dyed product was finished by washing in a conventional manner. The dyed product obtained was of uniform orange color free from unevenness and showed an excellent build-up property. The dyed product showed good fastness to light, perspiration-light, chlorinated water and washing.

Further, the dyeing process described above was carried out repeatedly. A good reproducibility of dyeing was obtained in respective runs.

EXAMPLE 13

With 20 parts of a dye represented by the formula (31) in the form of free acid (31)

were thoroughly mixed 40 parts of a dye represented by the formula (1) in the form of free acid and 40 parts of a dye represented by the formula (2) in the form of free acid. Separately, 50 parts of a dye represented by the formula (3) in the form of free acid was thoroughly mixed with 50 parts of a dye represented by the formula (4) in the form of free acid. Further, 20 parts of a dye represented by the formula (5) in the form of free acid was thoroughly mixed with 40 parts of a dye represented by the formula (6) in the form of free acid and 40 parts of a dye represented by the formula (7) in the form of free acid. The reactive dye compositions thus obtained were dissolved respectively in an amount of 15, 10 and 10 parts in hot water and cooled to 25° C. To the solution were added 15 parts by volume of an aqueous 32.5% sodium hydroxide solution, 150 parts of water glass of 50 degree Baumé and further water to make up the total into 1000 parts by volume. Immediately thereafter, a cotton woven fabric was pad-dyed by using the liquid obtained above as the padding liquor. The pad-dyed cotton fabric was rolled up, tightly sealed in polyethylene film, allowed to stand at a temperature of 25° C. for 20 hours, and then finished by washing and drying in a conventional manner. Upon examination of the compatibility of the dyes in the course of the standing, the respective dyes showed uniform dyeing rates and thus a good compatibility. The dyed product obtained was of uniform deep brown color and showed an excellent build-up property. The dyed product showed good fastness to light, perspiration-light, chlorinated water and washing.

Further, the dyeing process described above was carried out repeatedly. A good reproducibility of dyeing was obtained in respective runs.

We claim:

1. A fiber reactive dye composition which comprises at least 5 reactive dyes selected from the group of reactive dyes represented by the following formulas (I) to (VII) respectively in the form of free acid:

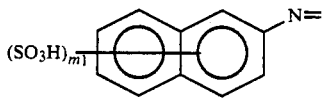

(I)

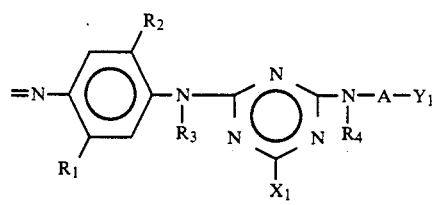

wherein $m_1$ is an integer of 1-3, $R_1$ and $R_2$ are each independently hydrogen, alkyl, alkoxy, acylamino or ureido, $R_3$ and $R_4$ are each independently hydrogen or unsubstituted or substituted alkyl, A is unsubstituted or substituted phenylene or naphthylene, $X_1$ is halogen and $Y_1$ is $-SO_2CH=CH_2$ or $-SO_2CH_2CH_2Z_1$, $Z_1$ being a group capable of being split off by the action of an alkali,

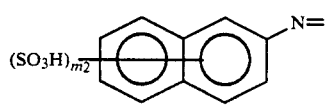

(II)

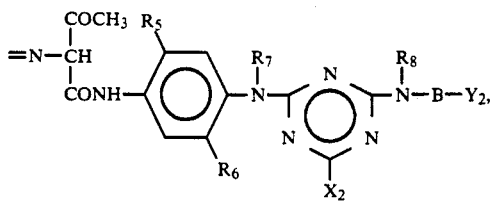

wherein $m_2$ is an integer of 1-3, $R_5$ and $R_6$ are each independently hydrogen, sulfo, alkyl or alkoxy, $R_7$ and $R_8$ are each independently hydrogen or unsubstituted or substituted alkyl, B is unsubstituted or substituted phenylene or naphthylene, $X_2$ is halogen and $Y_2$ is $-SO_2CH=CH_2$ or $-SO_2CH_2CH_2Z_2$, $Z_2$ being a group capable of being split off by the action of an alkali,

(III)

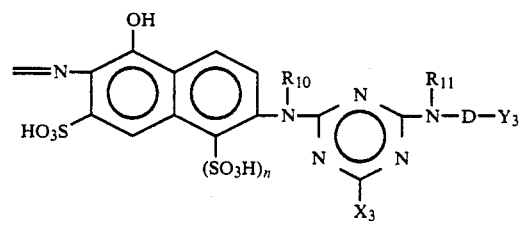

wherein n is 0 or 1, $R_9$ is hydrogen, alkyl or alkoxy, $R_{10}$ and $R_{11}$ are each independently hydrogen or unsubstituted or substituted alkyl, D is unsubstituted or substituted phenylene or naphthylene, $X_3$ is halogen and $Y_3$ is $-SO_2CH=CH_2$ or $-SO_2CH_2CH_2Z_3$, $Z_3$ being a group capable of being split off by the action of an alkali,

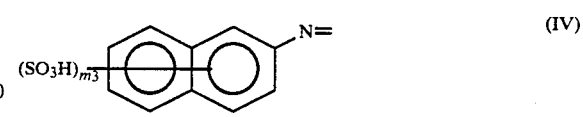

(IV)

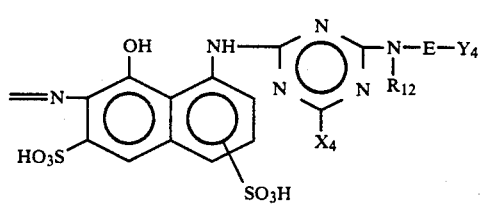

wherein $m_3$ is an integer of 1-3, $R_{12}$ is hydrogen or unsubstituted or substituted alkyl, E is unsubstituted or substituted phenylene or naphthylene, $X_4$ is halogen and $Y_4$ is $-SO_2CH=CH_2$ or $-SO_2CH_2CH_2Z_4$, $Z_4$ being a group capable of being split off by the action of an alkali,

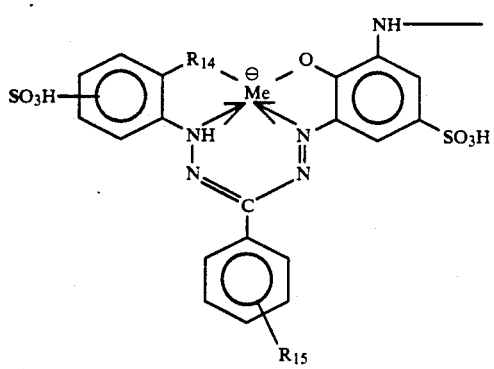 (V)

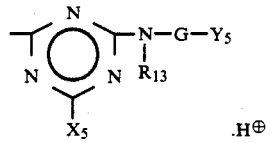

wherein $R_{13}$ is hydrogen or unsubstituted or substituted alkyl, $R_{14}$ is —O— or

$R_{15}$ is hydrogen, methyl, ethyl, nitro, sulfo or chlorine, G is unsubstituted or substituted phenylene or naphthylene, Me is a metal ion of an atomic number of 27–29, $X_5$ is halogen and $Y_5$ is
—$SO_2CH=CH_2$ or —$SO_2CH_2CH_2Z_5$, $Z_5$ being a group capable of being split off by the action of an alkali,

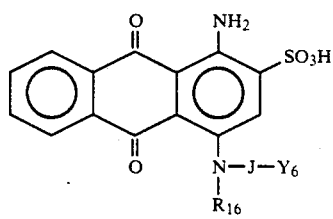 (VI)

wherein $R_{16}$ is hydrogen or unsubstituted or substituted alkyl, J is unsubstituted or substituted phenylene or naphthylene, $Y_6$ is —$SO_2CH=CH_2$ or —$SO_2CH_2CH_2Z_6$, $Z_6$ being a group capable of being split off by the action of an alkali, and

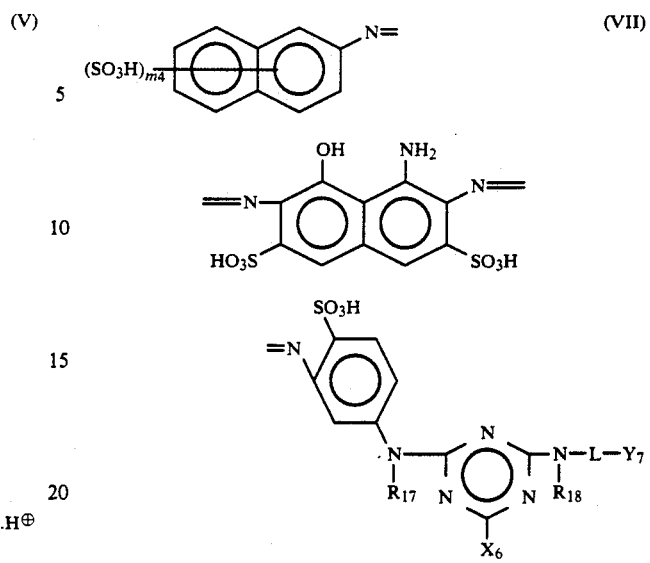 (VII)

wherein $m_4$ is an integer of 1–3, $R_{17}$ and $R_{18}$ are each independently hydrogen or unsubstituted or substituted alkyl, L is unsubstituted or substituted phenylene or naphthylene, $X_6$ is halogen and $Y_7$ is —$SO_2CH=CH_2$ or —$SO_2CH_2CH_2Z_7$, $Z_7$ being a group capable of being split off by the action of an alkali, provided that the dye composition contains respectively at least one yellow reactive dye selected from the group of reactive dyes represented by the formulas (I) and (II), red reactive dye selected from the group of reactive dyes represented by the formulas (III) and (IV) and blue reactive dye selected from the group of reactive dyes represented by the formulas (V) to (VII).

2. The composition according to claim 1, wherein the at least one yellow reactive dye comprises two reactive dyes each of which is one reactive dye selected from the respective groups of reactive dyes represented by the formulas (I) and (II) respectively.

3. The composition according to claim 1 wherein one of the yellow reactive dyes is a reactive dye selected from the group of reactive dyes represented by the formula (VIII) in the form of free acid

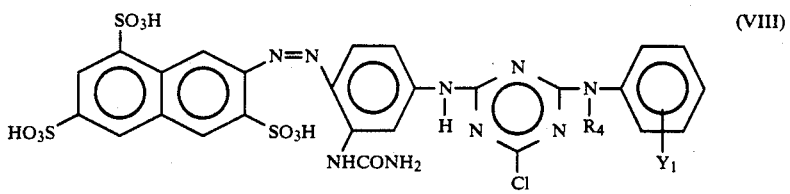 (VIII)

where $R_4$ and $Y_1$ are as defined in claim 1.

4. The composition according to claim 1, wherein one of the yellow reactive dyes is a reactive dye selected from the group of reactive dyes represented by the formulas (IX) in the form of free acid

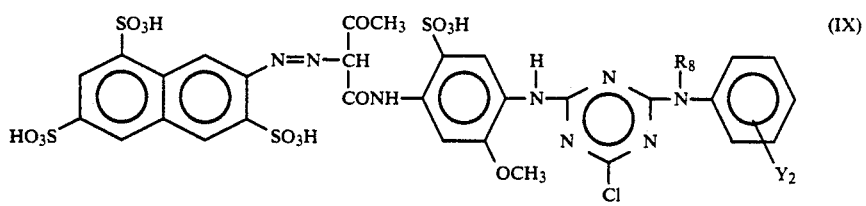

wherein $R_8$ and $Y_2$ are as defined in claim 1.

5. The composition according to claim 1, wherein the at least one red reactive dye comprises two reactive dyes each of which is one reactive dye selected from the respective groups of reactive dyes represented by the formulas (III) and (IV) respectively.

6. The composition according to claim 1, wherein one of the red reactive dyes is a reactive dye selected from the group of reactive dyes represented by the formula (X) in the form of free acid

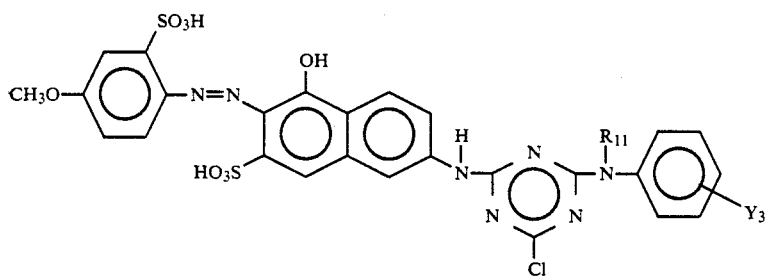

wherein $R_{11}$ and $Y_3$ are as defined in claim 1.

7. The composition according to claim 1, wherein one of the red reactive dyes is a reactive dye selected from the group of reactive dyes represented by the formula (XI) in the form of free acid

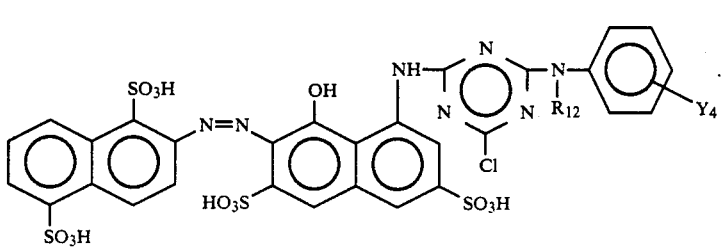

wherein $R_{12}$ and $Y_4$ are as defined in claim 1.

8. The composition according to claim 1, wherein the at least one blue reactive dye comprises three reactive dyes each of which is selected from the respective groups of reactive dyes represented by the formulas (V), (VI) and (VII) respectively.

9. The composition according to claim 1, wherein one of the blue reactive dyes is a reactive dye selected from the group of reactive dyes represented by the formula (XII) in the form of free acid

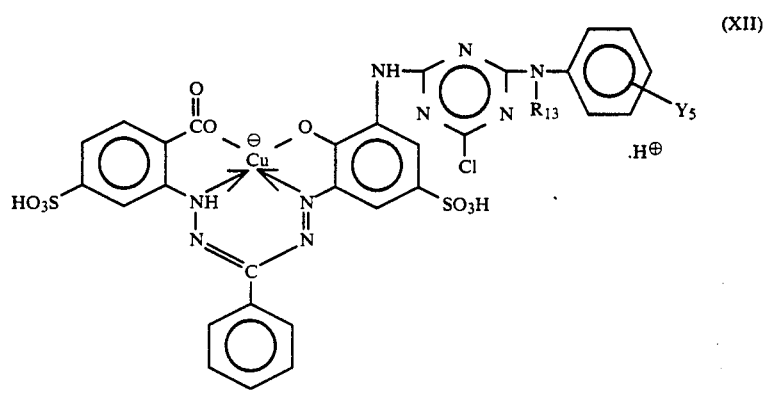

wherein $R_{13}$ and $Y_5$ are as defined in claim 1.

10. The composition according to claim 1, wherein one of the blue reactive dyes is a reactive dye selected from the group of reactive dyes represented by the formula (XIII) in the form of free acid

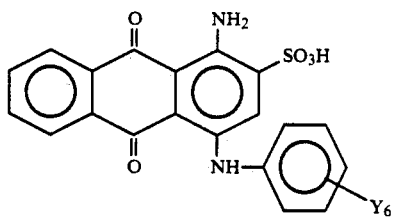

(XIII)

wherein $Y_6$ is as defined in claim 1.

11. The composition according to claim 1, wherein one of the blue reactive dyes is a reactive dye selected from the group of reactive dyes represented by the formula (XIV) in the form of free acid

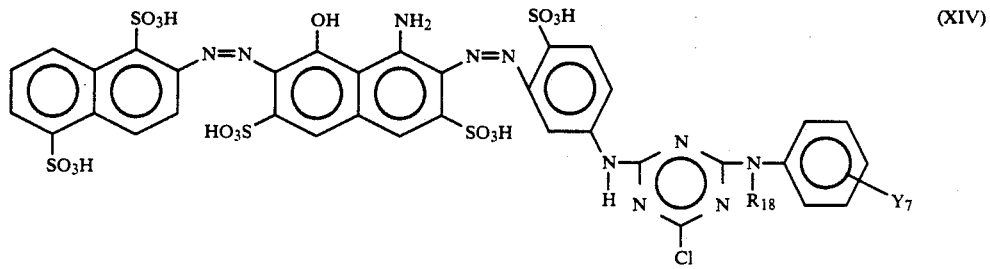

(XIV)

wherein $R_{18}$ and $Y_7$ are as defined in claim 1.

12. The composition according to claim 1, wherein the at least one yellow reactive dye comprises two reactive dyes each selected from respective groups of reactive dyes represented by the formulas (I) and (II) respectively, the at least one red reactive dye comprises two reactive dyes each selected from respective groups of reactive dyes represented by the formulas (III) and (IV) respectively and the at least one blue reactive dye comprises three reactive dyes each selected from respective groups of reactive dyes represented by the formulas (V), (VI) and (VII) respectively.

13. The composition according to claim 1, wherein the weight ratio of one reactive dye to the other reactive dye or to each of the other two reactive dyes is 1 to 1–30.

14. A method for dyeing or printing cellulose containing fiber materials which comprises using the fiber reactive dye composition according to claim 1.

* * * * *